United States Patent Office 3,324,169
Patented June 6, 1967

---

3,324,169
2,4'-BIS(HEXAFLUOROISOPROPYL)DIPHENYL SULFONE DICARBOXYLATE
Jerome Hollander and Cyril Woolf, Morristown, N.J., assignors to Allied Chemical Corporation, New York, N.Y., a corporation of New York
No Drawing. Filed Mar. 25, 1964, Ser. No. 354,777
1 Claim. (Cl. 260—470)

This invention relates to the compound, 2,4'-bis-(hexafluoroisopropyl) diphenyl sulfone dicarboxylate, and its preparation.

In view of its thermal and oxidative stability, 2,4'-bis-(hexafluoroisopropyl) diphenyl sulfone dicarboxylate is useful as a heat transfer fluid and as a high temperature lubricant.

An object of this invention is to provide a new and useful compound, 2,4'-bis-(hexafluoroisopropyl) diphenyl sulfone dicarboxylate. A further object is to provide a novel process for the preparation of this compound. Other objects and advantages will become apparent hereinafter.

In accordance with the invention, 2,4'-bis-(hexafluoroisopropyl) diphenyl sulfone dicarboxylate,

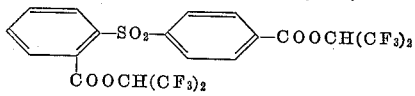

is produced by admixing the di-acid chloride of 2,4'-dicarboxydiphenyl sulfone with hexafluoroisopropyl alcohol as illustrated by the following generalized equation:

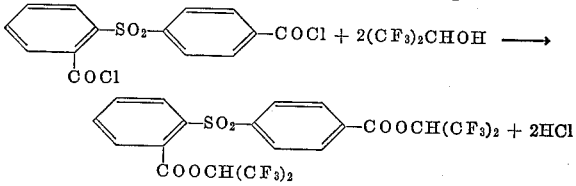

The process for the preparation of 2,4'-bis-(hexafluoroisopropyl) diphenyl sulfone dicarboxylate can be conducted by admixing the reactants in a reaction vessel such as a glass-lined container optionally equipped with stirring, refluxing, cooling and heating means. Practically, solutions of the reactants are used, but melts can be used if desired. Conducting the reaction in a liquid state or liquid medium enhances the reaction by providing effective surface contact between the reactants. A solution of the di-acid chloride of 2,4'-dicarboxy-diphenyl sulfone, a known compound, in pyridine or another solvent such as quinoline can be added to a solution of hexafluoroisopropyl alcohol in similar solvents. Hexafluoroisopropyl alcohol is prepared by the process shown in the copending application of Jerome Hollander and Cyril Woolf, Ser. No. 207,382, filed July 3, 1962. The ratio of each reactant to solvent in parts by weight can range from about 1:10 to about 8:1 to insure a high degree of facility in handling the reactants, but criticality is not involved.

The molar ratio of the reactants can be varied over a broad range. 1 to 4 mols of hexafluoroisopropyl alcohol per mol of the di-acid chloride of 2,4'-dicarboxydiphenyl sulfone can be used, and preferably, about 1.5 to about 2.5 mols of alcohol per mol of chloride.

The reaction can be conducted over a wide range of temperatures, which can range from about 0° C. to about 200° C. The preferred temperature range is from about 20° C. to about 120° C. The reaction can also be conducted initially with cooling to about room temperature and then at the reflux temperature of the reaction mixture, which ranges from about 115° C. to about 200° C. depending on the solvent used. The reaction time also covers a wide range from about 1 to about 15 hours and, usually, from about 3 to about 8 hours. Atmospheric pressure is preferable and most practical, but super-atmospheric and sub-atmospheric pressures can be used. The atmosphere surrounding the reactants can be air or an inert gas.

For best results stirring, initial cooling to room temperature and refluxing are used during the process. The product can be separated by pouring the reaction mixture into hydrochloric acid. The amount of hydrochloric acid which can be used should be in excess of the amount of solvent base, a typical amount being in the ratio of 3 mols of acid per mol of solvent base. The normality of the hydrochloric acid used can be about 1 to about 6 N and is preferably about 2 to about 4 N. On pouring the reaction mixture into the hydrochloric acid, the product, a brown solid, precipitates out.

In order to obtain a product having a high degree of purity, the precipitate can be dissolved in ether or another volatile solvent such as tetrahydrofuran. The remaining aqueous layer can then be extracted with ether or similar solvents. The solution of the precipitate and the ether extract is then combined and washed with water, hydrochloric acid, water, dilute sodium carbonate solution or other dilute basic solution, and then washed again with water. After the consecutive washings, the solution may be dried over anhydrous sodium sulfate or other drying agents such as magnesium sulfate. Then the ether or other volatile solvent is evaporated under reduced pressure. Recrystallization is suggested for further purification.

In the following examples parts and percentages are by weight.

EXAMPLE I

To a solution of 21.8 parts of hexafluoroisopropyl alcohol in 60 parts of pyridine, a solution of 20.6 parts of the di-acid chloride of 2,4'-dicarboxy-diphenyl sulfone in 180 parts of pyridine was added with stirring and cooling to room temperature. The reaction mixture was stirred at room temperature for ¾ of an hour and then at reflux for 6½ hours. The mixture was then poured into 500 ml. of cold 3 N hydrochloric acid. The brown solid which precipitated out was dissolved in ether. The aqueous layer was extracted with ether and the ether extract was combined with the ether solution of the brown solid precipitate. This combination was washed with 3 N hydrochloric acid, water, dilute sodium carbonate solution, and water again. After the consecutive washings, the ether solution was dried over anhydrous sodium sulfate. Removal of the ether under reduced pressure left 23.8 parts of a tan solid. Two recrystallizations from methanol produced 14.2 parts of 2,4'-bis-(hexafluoroisopropyl) diphenyl sulfone dicarboxylate as a white solid with a melting point of 120°–122° C.

*Analysis in percent.*—Calculated for $C_{20}H_{10}F_{12}O_6S$: H, 1.65; F, 37.6. Found: H, 1.71; F, 35.8.

The infra-red spectrum is consistent with the structure of the compound.

EXAMPLE II

The product, 2,4'-bis-(hexafluoroisopropyl) diphenyl sulfone dicarboxylate, of Example 1 was tested for thermal stability at 300° C. for 24 hours under nitrogen. The solid recovered after cooling was identified as the product of Example 1, used initially.

We claim:
A compound having the formula:
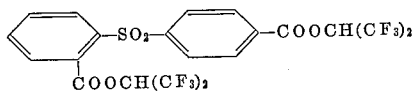
References Cited
UNITED STATES PATENTS
2,728,738   12/1955   Caldwell _____ 260—470
LORRAINE A. WEINBERGER, *Primary Examiner.*
RICHARD K. JACKSON, *Examiner.*